Dec. 12, 1950 I. SAGER 2,533,285

LINE PULSE MODULATOR

Filed July 6, 1944 3 Sheets-Sheet 1

INVENTOR.
IRVING SAGER
BY William D. Hall.
Attorney

Dec. 12, 1950 I. SAGER 2,533,285

LINE PULSE MODULATOR

Filed July 6, 1944 3 Sheets-Sheet 2

INVENTOR.
IRVING SAGER

BY William D. Hall.

ATTORNEY

Dec. 12, 1950 I. SAGER 2,533,285

LINE PULSE MODULATOR

Filed July 6, 1944 3 Sheets-Sheet 3

INVENTOR.
IRVING SAGER

BY William D. Hall.
Attorney

Patented Dec. 12, 1950 2,533,285

UNITED STATES PATENT OFFICE 2,533,285

LINE PULSE MODULATOR

Irving Sager, Deal, N. J.

Application July 6, 1944, Serial No. 543,741

12 Claims. (Cl. 250—17)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to keying circuits for radio transmitters and more particularly to the keying circuits which periodically key transmitters by means of pulses of short duration.

The invention will be described in connection with the radio object locating system, but it is obvious that the invention has a wider utility and may be used with any type of pulse-modulated radio transmitters.

In radio object locating systems the transmitted exploratory pulses are of extremely short duration and high power, effective operation of the systems depending to a very large extent on the power of the transmitted exploratory pulse. This type of operation requires very large concentration of power into extremely short periods of time, and the task of delivering this power to the transmitters, as a rule, evolves upon the keyers, since plate modulation is assuming more and more dominant position in the transmitter circuits of the radio object locating systems.

The invention discloses several keyers some of which are capable of handling very large currents, are stable in operation, light in weight, and use equipment which is readily available.

In accordance with one form of the invention, use is made of simple pulse generator circuits which include a mercury pool type tube generally known as an ignitron. A D. C. source is used for periodically charging an artificial line, and, upon the line being fully charged, discharging it very quickly through low impedance ignitrons. In one embodiment of the invention two ignitrons are connected in series in order to double the voltage handling capacity of the ignitrons. One of the ignitrons is ignited by means of periodic pulses supplied by a master oscillator, while the other ignitron is ignited immediately upon the ionization of the first ignitron by a charge which has been previously accumulated on a condenser connected in series with the same source of D. C. potential that is used for charging the artificial line. Upon the establishment of the arc in the second ignitron the artificial line discharges through the two ignitrons in series and through a transformer connected to a transmitter. This delivers the necessary power to the oscillator of the transmitter resulting in the transmission of the exploratory pulse by the radio locator. The charging circuit of the artificial line includes a high inductance choke, this choke forming a resonance circuit with the artificial line. The charging voltage follows an oscillatory path thus charging the line during the positive cycles of oscillations to a voltage which is approximately twice the voltage of the available source. In accordance with another embodiment of the invention the ignitrons are substituted by the thyratrons, the functioning of the circuit otherwise being similar to the functioning of the circuit using ignitrons. A keying circuit is also disclosed which accomplishes keying of the transmitter with the aid of only one ignitron, the ignitor electrode of which is prevented from carrying any current immediately upon the establishment of the cathode-anode current.

It is, therefore, an object of my invention to provide a novel keying circuit for two serially connected gas-filled tubes, one tube being ionized by the pulses originating at a master oscillator, while the other tube is ionized by means of a condenser.

Another object of my invention is to provide an ignition circuit for an ignitron where the ignitor element is protected from any possible exposure to excessive current thus prolonging the operating life of the ignitrons and enabling one to operate ignitrons continuously for long periods of time.

The novel features which I believe to be characteristic of my invention are set forth with particularity in the appended claims. My invention itself, however, both as to its organization and method of operation, together with the further objects and advantages thereof, may best be understood in connection with the following description in connection with the accompanying drawings in which:

Figure 1:
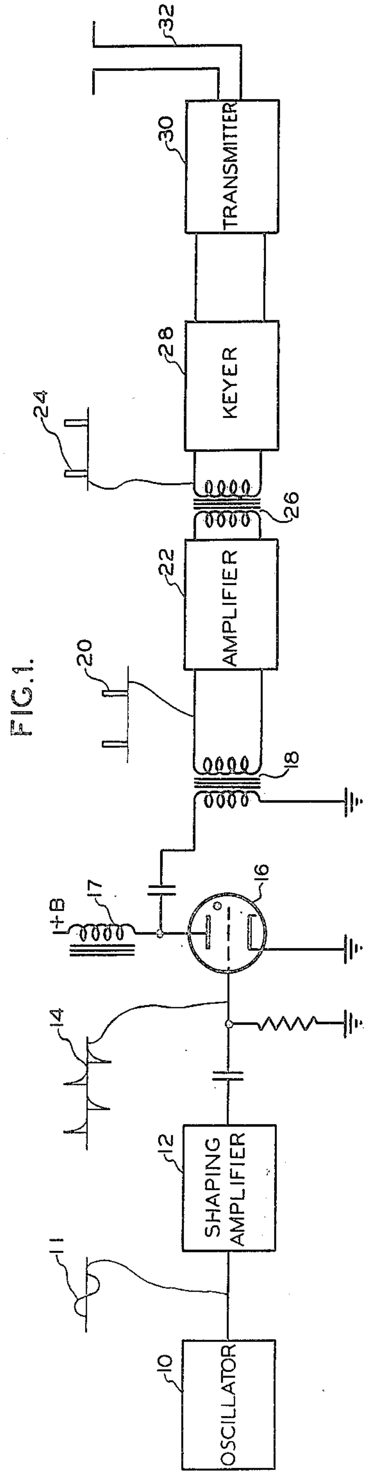
Figure 1 is a block diagram of a transmitting channel.

Referring to Fig. 1, a master oscillator 10, which keeps in step the transmitting receiving channels of radar, generates a sinusoidal wave 11 which is impressed on a shaping amplifier 12, the output of which is illustrated at 14. The shaping amplifier consists of a pulse-shaping pentode which is overdriven in the positive and negative directions by the sinusoidal wave 11. The output of the overdriven pentode represents a series of substantially rectangular positive and negative waves. These are impressed on a condenser-resistance differentiating network producing positive and negative pulses 14 in its output. For a more detailed description of the shaping amplifiers reference is made to the patent application of Wm. A. Huber, and Wm. T. Pope, Jr., Serial No. 506,808, filed October 19, 1943, titled "Radio Object Locating System."

The pulses 14 are impressed on a gas-filled triode 16, the output of which is coupled to the primary of a pulse transformer 18. The plate of triode 16 is connected to the positive terminal of a source of potential through a choke coil 17 which prevents the rectangular wave from appearing in the source of potential. Periodic pulses 20 appearing in the secondary of transformer 18 are impressed on a shaping amplifier 22 which reshapes the positive pulses 20 into a series of positive rectangular pulses 24 appearing in the secondary of a pulse transformer 26. Pulses 24 are impressed on a keyer 28 where they are used for discharging a Guillemin line. The Guillemin line is connected in series with a transformer, the secondary of which supplies plate potential for an oscillator in a transmitter 30. The latter is connected to an antenna 32 which radiates the exploratory pulses used for the detection of any objects capable of reradiating the transmitted energy.

Figure 2:
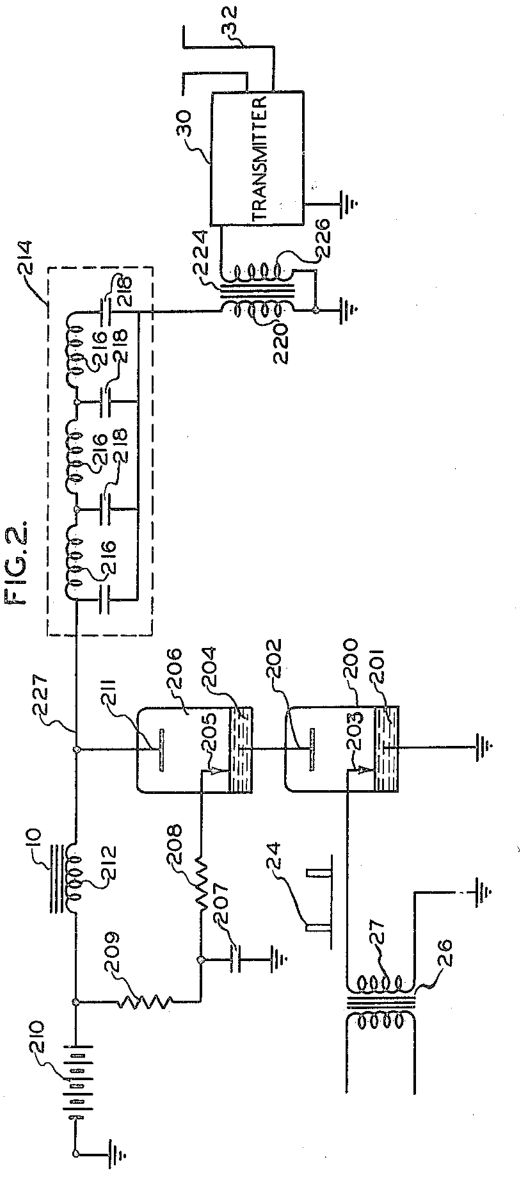
Figure 2 is a schematic diagram of a keyer using two ignitrons.

Referring now to Fig. 2 which discloses the schematic diagram of keyer 28, its circuit begins with pulse transformer 26, secondary 27 of which is connected in series with an ignitor electrode 203, and a mercury cathode 201 of an ignitron 200, the cathode as well as one side of the secondary being connected to ground. Anode 202 of ignitron 200 is directly connected to cathode 204 of the second ignitron 206. Its ignitor electrode 205 is connected to the positive terminal of a source of D. C. potential 210 through resistances 209 and 208. The junction point between the resistances 208 and 209 is grounded through a condenser 207, this condenser being normally fully charged to a potential equal to the potential of the D. C. source 210. The purpose of resistor 209 is for preventing continuous operation of the ignitrons, which become deionized upon discharging Guillemin line 216. The purpose of resistance 208 is for adjusting the discharge period of condenser 207 through ignitor electrode 205, cathode 204 and grounded ignitron 200, resistance 208 regulating the discharge current so as to avoid any injury of the ignitor electrode 205 by any sudden rush of current upon ionization of ignitron 200. Anode 211 of ignitron 206 is also connected to the positive terminal of source 210 through a choke coil 212 which has a magnetic core and very high inductance. Plate 211 as well as source 210 are both connected over a conductor 227 to the upper side of line 214, this line representing an artificial line composed of inductances 213 and condensers 218. The lower plates of condensers 218 are connected in parallel to ground through primary 220 of a step-up pulse transformer 226. Secondary 226 of this transformer is connected to an oscillator circuit of transmitter 30 where it supplies the necessary plate potential for periodically energizing the oscillator. The oscillator is connected over a transmission line to antenna 32 which transmits the exploratory pulses in the radio object locating system.

The operation of the keyer is as follows: Normally ignitrons 200 and 206 are in the deionized state. When pulse 24 is impressed on the ignitor electrode 203, ignitron 200 becomes ionized. Anode 202 is connected to condenser 207, which is fully charged at this instant. It discharges over the following circuit: resistance 208, ignitor electrode 205, anode 202, and grounded cathode 201. The discharge of condenser 207 over this circuit produces a hot spot in the mercury pool of ignitron 206 and the establishment of the cathode-anode current, the anode 211 potential being furnished at this instant by line 214, and particularly by its condensers 218. Thus the two ignitrons become fully ionized and represent a series circuit between ground and the line, which allows the line to discharge to ground, the circuit being two ignitrons in series on one side and the primary of transformer 220 on the other side. The duration of this pulse is determined by the time constants of the line and the impedance of the circuit through which it discharges. The discharge impedance must match the impedance of the line to avoid any reflections. Thus pulses of any desired length, such as a fraction of one microsecond or several hundred microseconds long, if so desired, may be impressed on secondary 226. This results in transmission of an exploratory pulse of the corresponding duration by antenna 32.

Figure 3:
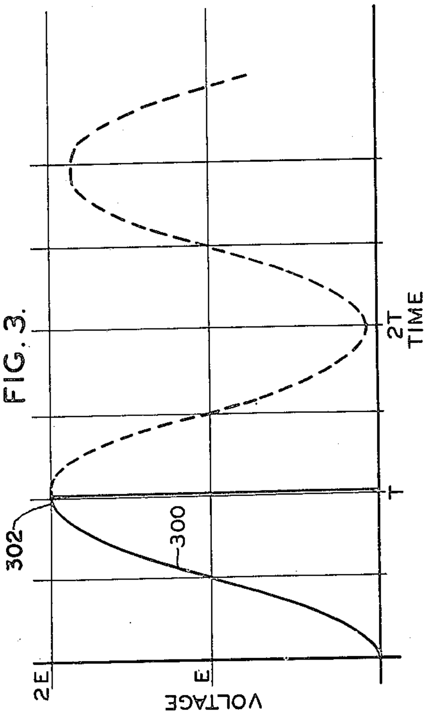
Figure 3 is an oscillogram of an artificial line charging voltage.

Line 214 is connected to source 210 through coil 212, the line, the coil, and primary 220 forming a resonant circuit. Accordingly, when the charging period of the line begins, current flows through the coil, and, because of the stored energy in the iron-core of the coil, the maximum voltage that is impressed on the line during the first half of the oscillatory cycle is in the order of twice the voltage source 210. This is illustrated in Fig. 3 where time T represents the time required for the charging voltage to reach its peak 302 during the transient oscillatory state which takes place immediately before the line is discharged through the ignitrons.

It is a very well known phenomenon in connection with the initiation of ignitrons that even when the ignition pulses impressed on the ignitor electrode are very carefully timed and their magnitudes controlled, there may be slight difference in time of actual ionization of the ignitrons, or, more specifically, the time between the application of the ignition pulse and the initiation of an arc between the mercury pool and the bracket holding the ignition electrode is not a constant. The arc between cathode and anode forms almost immediately upon ignition, closing the anode circuit in a very small fraction of a microsecond after the arc first bridges the mercury pool with the ignitor bracket. But the ignition time per se varies from cycle to cycle, the variations following a simple statistical law. These variations are known in the art as "jitter." However, in the operation under discussion, the rectangular pulse 24 creates a potential gradient much greater than the critical ignition voltage value, and, as a consequence, the variations in time of the establishment of the arc is only in the order of a fraction of a microsecond.

The question arises whether this variation in the ignition time of the ignitron is of such magnitude as to requre postive syncronization between the triggering pulses 24 impressed on the ignitor electron 203 and the charging cycle of the line. Comparison of the time constants involved immediately reveals the fact that such synchronization is unnecessary. Because of the very high inductance of coil 212, which may be in the order of 100–200 henrys, the value of inductance 212 depending upon the desired time constant of the Guillemin line, the duration T of the voltage cycle 300, (Fig. 3, solid line) may be in the order of 1,000 microseconds. This value compares so favorably with a fraction of a microsecond, which is the maximum variation in the ignition time, that any synchronization, other than giving proper parameters, is obviously unnecessary. For a more detailed discussion of the firing time of the ignitrons, reference is made to an article in "Electrical Engineering," September 1935, pages 942–949, titled "Firing Time of an Ignitor Type of Tube" by W. G. Dow and W. H. Powers. For a more detailed description of the behavior and the design formulae for the Guillemin line, reference is made to chapter 5, Foster's Theorem, in volume 2 of "Communication Networks" by E. A. Guillemin, published by John Wiley and Sons, Inc., 1935.

The reason for using two ignitrons in series in Fig. 2 is for enabling one to use standard type of ignitrons which are used in industry for various purposes, principally for controlling currents; since the maximum cathode-anode voltages in ordinary commercial applications of ignitrons are not especially high, standard ignitrons are designed to withstand only comparatively low commercial voltages. When the ignitrons of this type are used in connection with a keying circuit, such as illustrated in Fig. 3, it becomes necessary to connect the two ignitrons in series, and thus divide the maximum voltage 2E, Fig. 3, which appears between conductor 227 and ground, between the two ignitrons. In one embodiment of the invention the maximum voltage impressed on the two ignitrons in series is in the order of 16,000 volts; thus each ignitron is subjected in this arrangement to a maximum voltage of 8,000 volts. The high voltages used for charging the Guillemin line enable one to deliver the pulses of very large power, in the order of megawatt, to transmitter 30, which is obviously the final goal desired in the radio locators.

Summarizing briefly the operation of the keying circuit illustrated in Fig. 2, line 214 is periodically charged by source 210, and when the maximum voltage peak 302, Fig. 3, is reached, pulse 24 is impressed on the ignitor element of the lower ignitron 200, which at once establishes full ionization of this ignitron. As a result, condenser 207 discharges through the lower ignitron 200, which at once ionizes ignitron 205, and condensers 218, which at this instant have been charged to voltage 2E, discharge through the ignitrons and primary 220 of transformer 224. This furnishes the necessary plate voltage for the oscillator of transmitter 30. The cycle immediately repeats itself upon the deionization of the ignitrons, which takes place upon the discharge of the Guillemin line. The inductance of choke coil 212 and the value of the resistances 209, 208 are such that source 210 is incapable of maintaining the ionized state of the ignitrons upon the discharge of the line.

The following circuit constants and tubes give satisfactory operation with a 30 microsecond exploratory pulse:

Ignitrons 201 and 206: GL 415, General Electric Company.
Amplifier 22, Fig. 1: 2 Western Electric Co. tubes, type 715V connected in parallel.
Gas-filled tube 16, Fig. 1: RCA gaseous triode 2050.
Transformer 18: General Electric pulse transformer No. 68G711, 1 to 3 step-up ratio.
Transformer 26: "Hypersil" coil, step-down ratio 7.3 to 1.
Repetition rate of the rectangular pulses 24: 125 pulses per second.
Resistor 209: 300,000 ohms.
Resistor 208: 10 ohms.
Condenser 207: .02 microfarad.
D. C. source of potential 210: 8,000 volts.
Guillemin line 214:
  Time constant: 20 microsecond line.
  Inductance coils 216: 6.7 microhenrys each.
  Condensers 218: .04 microfarad each.
Transformer 224: "Hypersil" core, 1 to 3 step-up ratio.
Maximum modulation power of the pulse impressed on transformer 30: 1.5 megawatt.

Figure 4:
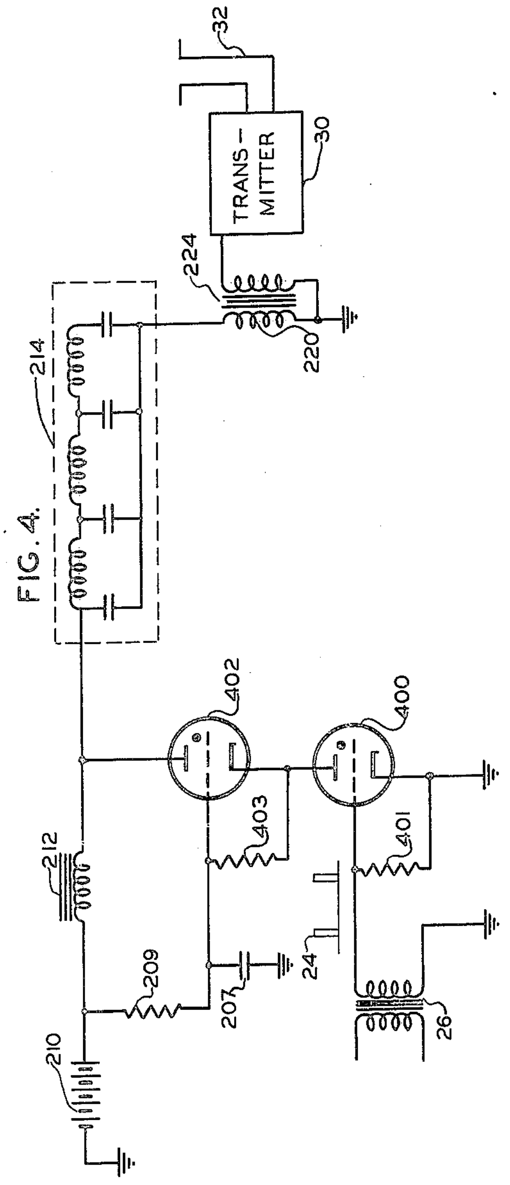
Figure 4 is a schematic diagram of a modification of the keyer disclosed in Fig. 2.

Fig. 4 discloses application of the circuit disclosed in Fig. 2 to the gas-filled tubes. This circuit may be used when the current-carrying capacity of the keyer needs not be high. The functioning of the keyer disclosed in Fig. 4 otherwise resembles the functioning of the keyer disclosed in Fig. 2.

The components performing the same functions in Figs. 2 and 4 bear the same numerals. As in Fig. 2, line 214 is charged by source 210 through inductance 212, the charging current following the oscillatory path illustrated in Fig. 3. One side of the line is connected to primary 220 of pulse transformer 224, the secondary of which is connected to transmitter 30, while the other side is grounded through two gas-filled tubes 400, 402 which are connected in series. The grids of the tubes are connected to the respective cathodes through grid resistors 401 and 403. Condenser-resistance combination 207—209 is used again, as in Fig. 2.

Normally tubes 400 and 402 are nonconductive. When pulse 24 renders tube 400 conductive, condenser 207 discharges through resistor 403 and tube 400, thus impressing a high positive potential on the control grid of tube 402. Since the anode of the latter is connected to the Guillemin line, the line immediately discharges to ground through the two tubes in series and delivers the required pulse to transmitter 30. The disadvantage of the circuit disclosed in Fig. 4 resides in the fact that the current-carrying capacity of the gas-filled tubes is much lower than the current carrying capacity of the ignitrons illustrated in Fig. 2 and, as a consequence, the gas-filled tubes represent the power-limiting component in the keyer circuit. The advantage of the circuit, on the other hand, resides in the fact that it is extremely stable in operation since the ionization of the gas medium in the gas-filled tubes takes place without any delay and does not follow the random distribution pattern of ignition in the ignitrons; as a consequence, there is no "median ignition time" phenomenon or jitter present in this case.

Figure 5:
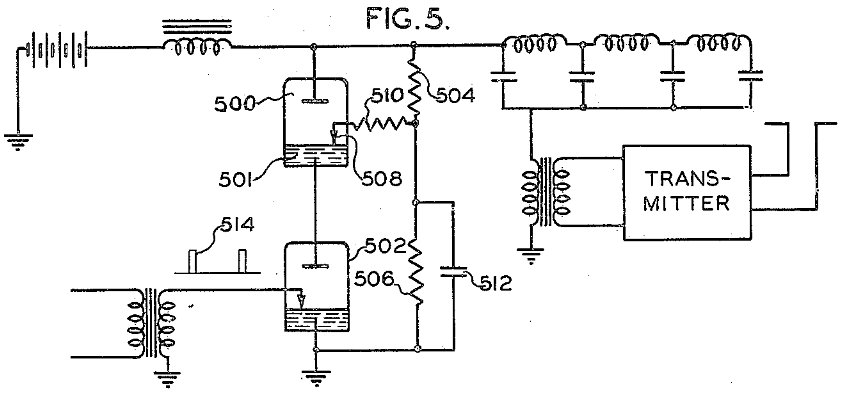
Figures 5 and 6 are two additional modifications of the circuit disclosed in Fig. 2.

Fig. 5 discloses a modified form of the circuit disclosed in Fig. 2. The modification resides in shunting the two ignitrons 500 and 502 by means of the voltage dividing resistors 504 and 506, connecting the ignitor electrode 508 of the upper ignitron 500 through a resistance 510 to the junction point between the shunting resistors 504 and 506, and connecting the ignition condenser 512 across resistance 506. The functioning of this circuit is similar to the functioning of the circuit disclosed in Fig. 2, with the exception that condenser 512 circuit is now subjected to a high charging voltage, or voltage 2E, indicated in Fig. 3. Normally the ignitrons are in a deionized state, and ignitron 502 becomes ionized upon the deliverance of the rectangular pulse 514, the positive anode potential at this instant being supplied by the fully charged condenser 512. Condenser 512 discharges through the current-limiting resistor 510, ignitor 508, cathode 501, and ignitron 502, which at once ionizes the upper ignitron 500. The Guillemin line discharges through the two ignitrons and transformer 224. Resistor 504 is positioned so that the time constant of the condenser-resistance combination 512—504 is sufficiently low so as to charge fully condenser 512 during the interval of time T, Fig. 3. Resistor 510 accomplishes exactly the same function as resistor 208 in Fig. 2, and, therefore, acts merely as a current-limiting resistor during the discharge period of condenser 512. Resistor 506 is used for positively limiting the voltage impressed across the lower ignitron 502 and condenser 512.

Figure 6:
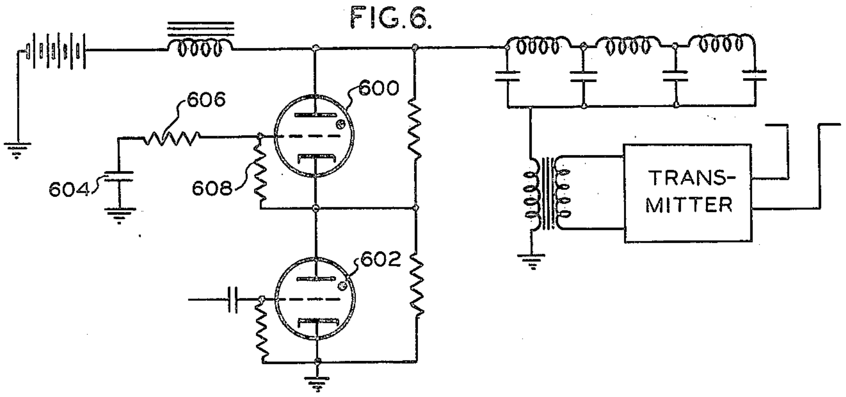

Fig. 6 discloses an application of the circuit disclosed in Fig. 5 to the thyratrons. This circuit may be used when the current-carrying capacity of the circuit need not be as high as the current-carrying capacity of the circuit illustrated in Fig. 5. Normally the two thyratrons are nonconductive. When the positive rectangular pulse is impressed on the control grid of thyratron 602 it becomes conductive since it is under the influence of the positive charge accumulated on condenser 604. Condenser 604, therefore, discharges to ground through resistors 606, 608 and thyratron 602. The discharge current through resistor 608 impresses high positive potential on the control grid of thyratron 600, and since the plate of this thyratron is now under the influence of the high positive potential 2E, Fig. 3, the two thyratrons become at once conductive and discharge the Guillemin line to ground as in the previous examples.

Figure 7:
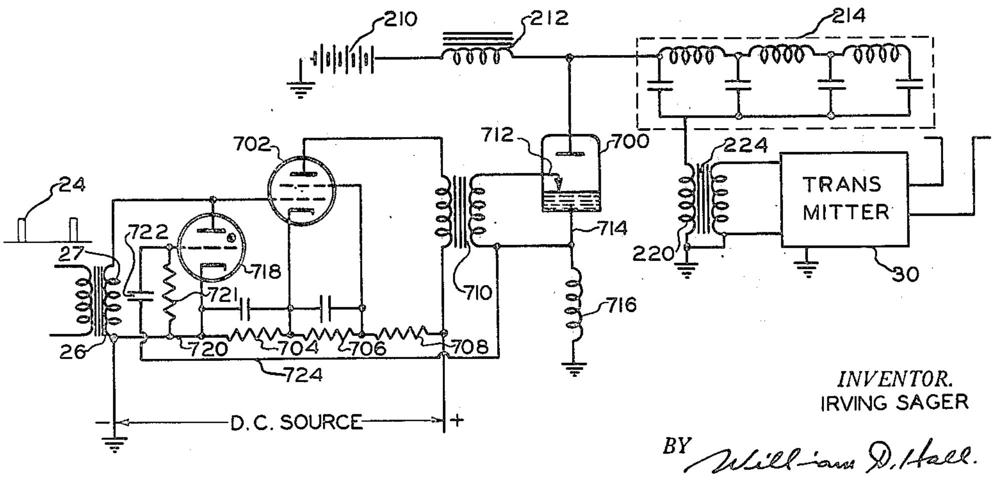
Figure 7 is a schematic diagram of a keying circuit using only one ignitron, the ignitor element being protected from any injurious excessive currents.

Actual operation of the ignitrons in the keying circuits has disclosed the fact that the most sensitive element in the entire circuit is the ignitor electrode used for establishing the hot spot on the mercury pool of the ignitrons. As is well known in the art, the radio locators as a rule operate continuously over long periods of time, this type of operation being especially common in connection with radio locators assigned for continuous routine surveillance of the assigned areas. Since the establishment of ignition must take place in an extremely short period of time, very large power must be delivered to the ignitor electrode, the cumulative effect of this type of operation eventually resulting in premature burning out of the ignitor electrode. It has also been discovered that the life of the ignitor electrodes, and, as a consequence, of the entire keyer, may be increased many fold if precautions are taken to prevent in some positive manner the ignitor electrode from carrying any current immediately upon the establishment of the main cathode-anode circuit. Fig. 7 discloses a circuit which accomplishes this result by means of a feed-back circuit between the ignitron and the ignitor circuit, this feed-back circuit preventing the continuance of any current in the ignitor circuit immediately upon the establishment of the full ionization in the ignitron.

As in the preceding arrangement, a source of D. C. potential 210 is used for periodically charging a Guillemin line 214 through an inductance 212, the charging current following the current pattern illustrated in Fig. 3. Upon reaching of the maximum voltage 2E, the Guillemin line is discharged through an ignitron 700 delivering the necessary keying pulse to a transmitter 30 as in all preceding arrangements.

Full ionization of ignitron 700 is accomplished in the following manner: positive rectangular pulses 24 are impressed on the control grid of a pentode 702 which is normally biased so as to be nonconductive by means of a voltage divider consisting of resistors 704, 706 and 708 connected across a source of D. C. potential. The control grid of the pentode is connected to the cathode through secondary 27 and biasing resistor 704. The plate of pentode 702 is connected to the primary of a pulse transformer 710 and to the source of potential, resistors 706 and 708 completing its cathode plate circuit. The rectangular pulse 24 is thus amplified in pentode 702 and is impressed on the secondary of transformer 710, the secondary of this transformer being connected on one side to the ignitor electrode 712, and on the other side to the cathode terminal 714. The cathode terminal 714 is grounded through a small inductance coil 716. The rectangular pulse impressed on the ignitor electrode 712 establishes an arc between the mercury pool and the ignitor, which at once produces full ionization of the ignitron and discharge of the Guillemin line to ground.

The grid-cathode circuit of pentode 702 is shunted by a gas-filled tube 718, the plate of this tube being connected to the grid of pentode 702 while the cathode is connected to a conductor 720 joining resistance 704 to secondary 27. The grid of the gas-filled tube is connected to the same conductor 720 through a grid resistor 721, and through a coupling condenser 722 and a conductor 724 to the cathode electrode 714 of the ignitron. It is this gas-filled tube, connected across the input circuit of pentode 702, and having its grid coupled to the ignitron through the condenser, that is used for preventing the continuance of current in the ignitor electrode upon the ionization of the ignitron.

In Figs. 1 through 6 the duration of the pulses used for the initiation of the arc must be so adjusted as to span the entire random time period determined by the statistical law in order to avoid any possibility of ignition failure in the keyer. When the ignition actually takes place only after maximum duration of the igniting pulse, the igniting pulse thus ceasing immediately upon the full ionization of the ignitron, the ignitor electrode in such a case carries only the absolutely necessary current for producing the full ionization of the ignitron. However, when the establishment of the arc between the mercury pool and the ignitor's bracket takes place some time before the cessation of the ignition pulse, relatively large voltage will be still impressed on the ignitor electrode circuit even after the establishment of the necessary arc, and, as a consequence, the ignitor electrode will carry very large parasitic currents which are many times larger than the normal ignition currents. It is these parasitic currents that cause premature burning out of the ignitor electrodes and failure of the keying circuits. The feed-back circuit, consisting of conductor 724 and condenser 722 and a gas-filled tube 718 is used for arresting any continued supply of voltage to the ignitor electrode circuit immediately upon the full ionization of the ignitron. When large cathode-anode current appears in the ignitron, the inductance coil 716 impresses high positive voltage on condenser 722 which produces immediate ionization of the gas-filled tube 718. Since this tube is connected directly across the secondary of transformer 26, the remaining portion of the rectangular pulse is shorted by the low impedance of the gas-filled tube, and the control grid of pentode 722 becomes once more connected to the negative source of potential. Accordingly, pentode 702 is at once rendered nonconductive, and the voltage impressed on the ignitor circuit is thus removed immediately upon the closing of the main cathode-anode circuit in the ignitron 700.

The advantages of the disclosed line pulse modulators should be apparent to those skilled in the art from the given disclosure. The idle time periods between the keying pulses impressed on the transmitter may be very carefully timed, and pulses of extremely short duration, from a fraction of 1 microsecond and up may be generated. The pulses possess very large power, such as 1 megawatt or higher. The stability of the pulses from the point of view of timing and the power impressed on the transmitter is so high that it approaches the stability of the master oscillator of the entire system, only minor variation being introduced by the ignition of the ignitrons. When thyratrons are used then the stability of the keying circuit is determined solely by the stability of the master oscillator, the line-pulse modulator introducing no errors of its own into the system. This is a matter of paramount importance in many radio locating systems. In Figs. 2 and 5 only two ignitrons, connected in series for discharging the Guillemin line, are illustrated. When still higher voltages are desired it is obvious that the configuration of the circuit is such that it lends itself very readily to any desired multiplication of the number of ignitrons in the above mentioned series circuit. In order to accomplish this result the connections of the additional ignitrons in Fig. 2 should be identical with the connections of ignitron 206, while in Fig. 5 the connections would be identical to the connections of ignitron 500. The circuit disclosed in Fig. 2 is more readily adaptable to a larger number of ignitrons in series than the one illustrated in Fig. 5, since in Fig. 2 the resistance condenser-networks, such as resistances 208, 239 and condenser 207, would be connected in parallel to the same source of potential 210, while in Fig. 5 multiplication of the number of ignitrons results in the increase of the time constant of the resistance condenser combinations 503, 504, 506 and 512 because of the series nature of the circuit.

Circuits are also disclosed which offer a high degree of protection of the ignitor electrode resulting in the prolonged life of this element which otherwise is the weakest point in the system. An additional advantage typical of the circuits disclosed in Figs. 2, 5 resides in the fact that extremely low average power requirements are imposed upon the pulse generating circuits connected to the ignitor-cathode circuit of the lower ignitron 209 in Fig. 2, 502 in Fig. 5 for two reasons: first, the duration of the ignition pulses 24 is in the order of 1 microsecond, and, second, only one pulse is required for ionizing the two ignitrons connected in series, the ionization of the other ignitron being accomplished not by the pulse generating circuits but by the D. C. source 210, thus decreasing the power requirements imposed upon the pulse generating circuits by 50%. Prolonged life and lesser number of tubes and pulse transformers is the result.

From the description of the circuits using ignitrons it is obvious that the only power limiting factor in the line pulse modulators are the Guillemin line, the pulse transformer connected to the transmitter, and the source of D. C. potential, the ignitrons not being the power limiting factor in the keying system. As is very well known in the prior art, the modulating tubes always constituted the power limiting element in modulators whenever large power requirements were imposed upon them. The disclosed modulators obviously solve this difficulty completely since the current carrying capacity of the ignitrons is limited only by their cooling systems.

It is believed that the construction and operation of my new line pulse modulator as well as the many advantages thereof will be apparent from the foregoing description. It will, therefore, be apparent that while I have shown and described my invention in several preferred forms many changes and modifications may be made without departing from the spirit of my invention as sought to be defined in the following claims.

I claim:

1. A line pulse modulator including first and second gaseous discharge paths connected in series, a source of potential connected across said discharge paths, an artificial line connected to said source of potential and forming a parallel circuit with said discharge paths, a source of pulses connected to and capable of ionizing said first path, and resistor means connecting said second discharge path to said source of potential for ionizing said second path upon the ionization of said first path whereby said artificial line discharges through said two paths in series.

2. A keyer including a series circuit of a grounded source of potential, a choke coil, an artificial line, and a grounded pulse transformer; first and second gaseous tubes, each having a cathode, an anode, and a control electrode, said tubes being connected in series between ground and the junction point between said choke coil and said artificial line, the cathode of said first tube being connected to ground, and the anode of said second tube being connected to said junction point; a source of pulses connected to and periodically rendering conductive said first tube; and resistor means connecting the cathode and the control electrodes of said second tube to said source of potential, for rendering said second tube conductive upon conduction of said first tube, whereby said artificial line is periodically discharged through said tubes and said transformer.

3. A keyer as defined in claim 2, wherein said resistor means includes a first resistance interconnecting said positive source of potential and the control electrode of said second tube and a second resistance interconnecting the control electrode of said second tube with its cathode and the anode of said first tube; and which further includes a grounded condenser connected to the control electrode of said second tube, said condenser being charged by said source of potential, and discharged through said first tube.

4. A keying circuit as defined in claim 2 in which said first and second gaseous tubes comprise ignitrons, said source of pulses rendering said first and second ignitrons conductive at the instant when the oscillatory charging voltage impressed on said artificial line reaches its first maximum positive peak.

5. A keying circuit as defined in claim 2 in which said source of pulses comprises a master oscillator and a series of pulse-shaping amplifiers transforming the sinusoidal wave of said oscillator into a series of uni-polar periodic pulses.

6. A keying circuit as defined in claim 2, wherein said choke coil, artificial line, and transformer form a series resonant circuit.

7. A keying circuit including a source of pulses, a first ignitron including a grounded cathode, an ignitor electrode and an anode; said ignitor electrode and said cathode being connected to said source of pulses whereby said pulses produce ignition in said first ignitron; a second ignitron connected in series with said first ignitron, said second ignitron including a cathode, an ignitor electrode, and an anode; a grounded pulse transformer, a grounded source of potential connected with its positive terminal to a choke coil, an artificial line connected with its one terminal to said choke coil and the anode of said second ignitron, and with its other terminal to the ungrounded terminal of the primary of said pulse transformer, first and second resistors connected in series between the ignitor electrode of said second ignitron and said source of potential; and a grounded condenser connected to the junction point between said first and second resistors; said keying circuit being so constructed and arranged that said condenser produces ignition in said second ignitron upon the establishment of ignition in said first ignitron, and said artificial line generates a keying pulse in said transformer by discharging through said first and second ignitrons in series upon the establishment of ignition in said second ignitron by said condenser.

8. A keyer including a series circuit of a grounded source of potential, a choke coil, an artificial line, and a grounded connection to a transmitter; first and second ignitrons connected in series between ground and the junction point between said choke coil and said artificial line; each of said ignitrons having a cathode, an ignitor electrode and an anode; the cathode of said first ignitron being connected to ground, and the anode of said second ignitron being connected to said junction point; a source of pulses connected to the ignitor electrode-cathode circuit of said first ignitron; first and second resistors connected in series with respect to each other and forming a connection between the ignitor electrode of the second ignitron and said source of potential; and a grounded condenser connected to the junction point between said resistors; said source of potential periodically charging said artificial line and said condenser; and said ignitrons periodically discharging said artificial line and said condenser; said series circuit being so constructed and arranged as to form a resonant circuit whereby the charging voltage of said artificial line follows a transient path, and said source of pulses is so timed with respect to the transient path of said charging voltage as to render said ignitrons conductive for discharging said artificial line at substantially an instant when said charging voltage reaches the first maximum positive peak, the discharge of said line delivering a keying pulse to said transmitter.

9. A keyer as defined in claim 8 in which said first resistance has a resistance value, and said choke coil has an inductance value, such as to prevent continued energization of said ignitrons immediately after discharge of said artificial line through said ignitrons.

10. A keyer including a series resonant circuit of a source of potential grounded with its negative terminal, a choke coil, an artificial line and a grounded connection with a transmitter, first and second gaseous triodes connected in series between ground and the junction point between said choke coil and said artificial line, the cathode of said first triode being connected to ground and the anode of said second triode being connected to said junction point, first and second resistors connected in series and connecting said junction point to ground, a grounded condenser connected to a conductor interconnecting said resistors, a third resistor connecting said conductor to a control electrode of said second triode, and a source of pulses connected to said first triode, said pulses and said condenser being instrumental in rendering said triodes periodically conductive whereby said artificial line is periodically discharged through said triode and through said grounded connection with the transmitter thereby impressing keying pulses on said transmitter.

11. A keyer including a series resonant circuit of a source of potential, a choke coil, an artificial line and a radio transmitter, a first ignitron including a cathode, an ignitor electrode and an anode, the ignitor electrode-cathode circuit of said first ignitron being connected to a source of pulses capable of producing ignition in said ignitron, a second ignitron having a cathode, an ignitor electrode and an anode, the anode of said first ignitron being connected to the cathode of said second ignitron, and the anode of said second ignitron being connected to a conductor interconnecting said choke coil and said artificial line, a resistance element connecting the ignitor electrode of said second ignitron to said conductor, and a condenser connected between the cathode of said first ignitron and a point on said resistor, said source of potential periodically charging said artificial line and said condenser, and said pulses, together with the charges on said condenser and said artificial line, periodically rendering said ignitrons conductive thereby periodically discharging said artificial line through said ignitrons and through said radio transmitter said discharging artificial line furnishing keying pulses for said transmitter.

12. A keyer including a transmitter; a series resonant circuit of a source of potential grounded with its negative terminal, a choke coil, an artificial line, and means for coupling said artificial line to said transmitter; first and second gas-filled triodes, each having a cathode, grid, and an anode, said triodes being connected in series, with the anode of the second triode being connected to a conductor interconnecting said choke coil and said artificial line, a first resistance shunting the cathode-plate circuit of said first triode, a second resistance shunting the cathode-plate circuit of the second triode, a third resistance connecting the grid of said second triode to a conductor interconnecting the plate of the first triode to the cathode of the second triode, a fourth resistance connected with one terminal to the grid of the second triode and with the other terminal to a grounded condenser, and a source of pulses connected to the grid-cathode circuit of the first triode for rendering said first and said second triodes conductive for periodically discharging said artificial line through said triodes and through said means whereby said means periodically impress keying pulses on said transmitter.

IRVING SAGER.

REFERENCES CITED

The following references are of record in the file of this patent:

UNITED STATES PATENTS

| Number | Name | Date |
|---|---|---|
| 2,021,034 | Thompson | Nov. 12, 1935 |
| 2,266,401 | Reeves | Dec. 16, 1941 |
| 2,288,554 | Smith | June 30, 1942 |
| 2,391,894 | Gorham et al. | Jan. 1, 1946 |
| 2,400,457 | Haine | May 14, 1946 |
| 2,405,070 | Tonks et al. | July 30, 1946 |
| 2,411,898 | Schelleng | Dec. 3, 1946 |
| 2,416,718 | Shockley | Mar. 4, 1947 |
| 2,420,309 | Goodall | May 13, 1947 |
| 2,422,086 | Evans | June 10, 1947 |
| 2,432,227 | Dailey et al. | Dec. 9, 1947 |
| 2,462,918 | Stiefel | Mar. 1, 1949 |

FOREIGN PATENTS

| Number | Country | Date |
|---|---|---|
| 489,021 | Great Britain | Oct. 15, 1936 |